Patented June 13, 1933

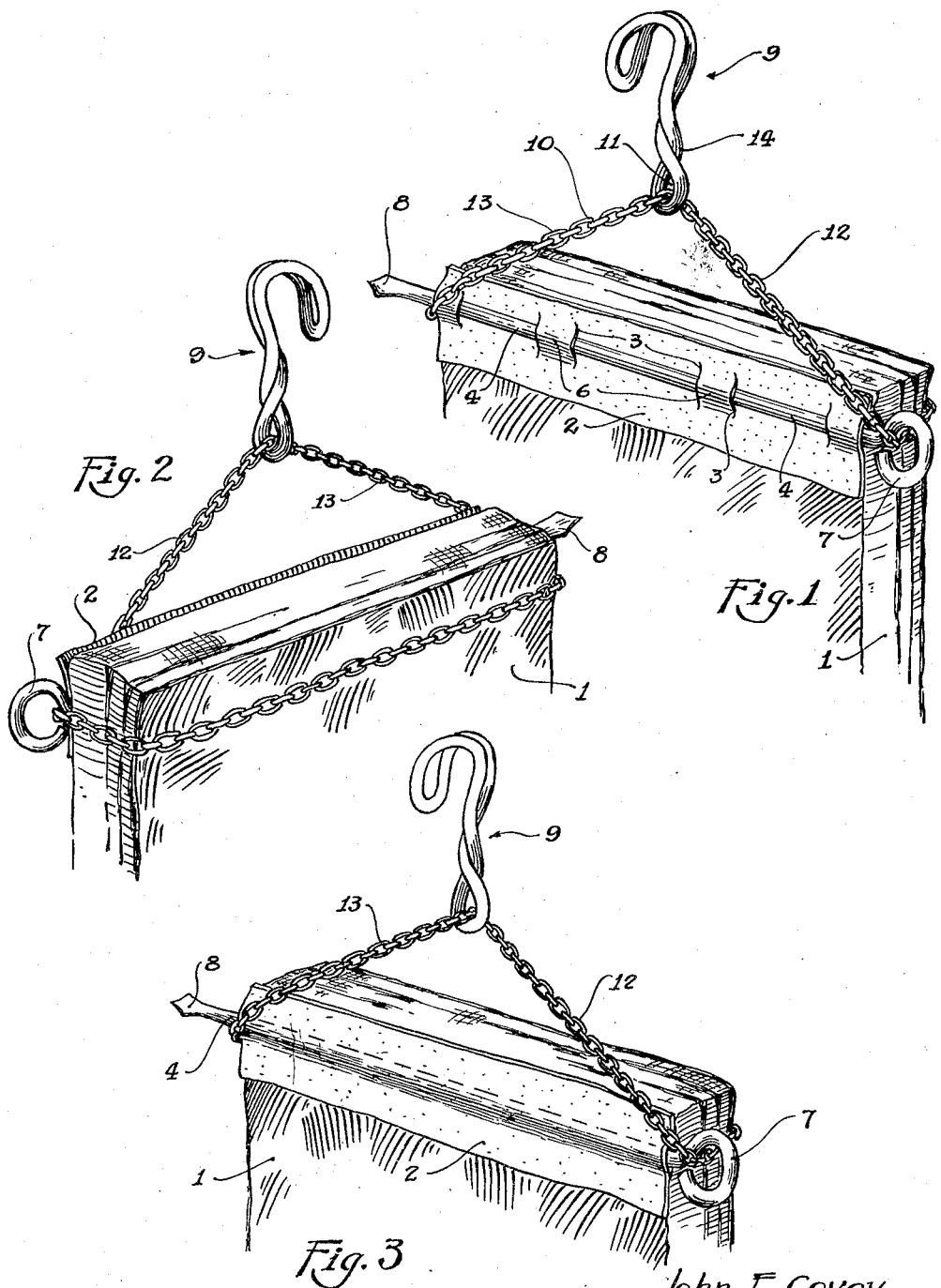

1,913,832

UNITED STATES PATENT OFFICE

JOHN E. COVEY, OF CHICAGO, ILLINOIS, ASSIGNOR TO SWIFT AND COMPANY, OF CHICAGO, ILLINOIS, A CORPORATION OF ILLINOIS

HANGER FOR BACON

Application filed October 5, 1931. Serial No. 566,954.

The invention relates to a hanger for bacon.

The device of the present invention which is equally adapted to the production of skinned bacon and to the production of bacon upon which the skin is permitted to remain, is especially adapted and designed for hanging skinned bacon. The conventional bacon of commerce is produced by curing and smoking that portion of the hog carcass known as the belly, two sides of bacon being produced from each hog.

Bacon is marketed either in the slab or sliced. Much of the bacon produced in the packing house is sliced and packed in the packing house, being shipped by the packing house to large quantity consumers or retailers.

Sliced bacon must be produced in condition for immediate use without further trimming by the consumer. As the skin or rind is inedible by reason of its toughness it must be removed before the bacon is sliced. Slab bacon is ordinarily sold by the packer to the retailer without removing the skin which is permitted to remain to protect the bacon and minimize weight losses.

Usually the skinned bellies are skinned before curing in order that use may be made of the skin, but the latter may be removed either before or after smoking.

In conventional packing house practice, whether the skin is removed or not, a comb hanger or toothed instrument is attached to one end of the product by inserting the nail-like teeth of the hanger entirely through the product, the product then being suspended in smoke by the hanger, as it is necessary that the product be well secured in order to withstand the ordinary handling in processing. Such insertion of the teeth of a comb hanger entirely through one end of the belly results in unsightly holes which cause the grading down and sometimes utter loss of perhaps one pound on each belly.

In ordinary commercial practice, large scale retailers of bacon purchase the skinned bellies in the slab form from the packer and regularly return and receive credit for the end through which the teeth have been inserted. Such returned product must be disposed of by the packer at a greatly reduced price. This is a considerable item, inasmuch as a large quantity of bacon is sliced at the packing house or by large scale retailers. The device of the present invention avoids such unsightly holes in the product in both skinned and unskinned bellies.

In the preferred form of the present invention as practiced in connection with skinned bellies all of the skin of the belly is removed with the exception of a narrow strip of about one inch in width at one end of the belly and the hanger is engaged with this narrow strip of skin.

With these and other objects in view, the invention consists in the construction and novel combination and arrangement of parts hereinafter described, illustrated in the accompanying drawing, and set forth in the claims hereto appended, it being understood that various changes in the form, proportion and minor details of construction, within the scope of the claims, may be resorted to without departing from the spirit of the invention or sacrificing any of the advantages thereof.

In the drawing:

Figure 1 is a perspective view of a bacon hanger constructed in accordance with this invention and shown applied to a slab of bacon and viewed from the skinned side thereof.

Fig. 2 is a similar view viewed from the lean side of the bacon.

Fig. 3 is a perspective view of a bacon hanger constructed in accordance with this invention showing the skewer entirely beneath the skin.

Referring to the drawing in which is illustrated the preferred embodiment of the invention, 1 designates a belly or bacon slab having all of the skin removed therefrom with the exception of a narrow strip 2 about one inch wide extending across the slab 1 at one end thereof.

The narrow strip 2 of skin is slit at intervals to form ribbon-like cuts 3 to permit a skewer 4 of the hanger to be laced through the said narrow strip 2, as clearly illustrated in Fig. 1 of the drawing. The cuts 3 are preferably located adjacent the ends of the strip 2 and in pairs at intervals intermediate of the ends of the strip 2 to provide narrow vertically disposed partially severed portions 6 beneath which the skewer 4 is passed, so that the major portion of the skewer will lie exteriorly of the narrow strip 2 of skin and only a minimum portion of the skewer will be permitted to come in contact with the edible portion of the slab.

The skewer 4 which constitutes a straightening rod for the slab is of the ordinary construction and is provided at one end with an eye 7 and the other end 8 is pointed to enable it to be readily laced through the narrow strip 2. The skewer is of sufficient length so that the pointed end projects beyond the adjacent side edge of the slab of bacon.

The slab of bacon is suspended from a supporting hook 9 by a flexible hanger member consisting of a chain 10, but any other suitable flexible material may, of course, be employed. The chain 10 passes through an eye 11 of the supporting hook and extends downwardly and outwardly therefrom at an inclination to provide oppositely inclined side portions 12 and 13. One of the side portions 12 passes through the eye 7 of the skewer and the other side portion 13 of the flexible hanger member passes beneath the extended pointed end of the skewer.

The chain then passes across the side edges of the slab of bacon and around the lean face thereof to form a clamp for holding the slab of bacon tightly against the skewer which constitutes a straightening rod. The weight of the slab of bacon causes the chain to clamp the slab of bacon tightly against the skewer and the slab is thereby effectively prevented from curling while smoking and curing the same.

The hook which may be of any preferred construction is preferably made of heavy wire or similar material and is composed of two sides which are twisted together at the shank 14 of the hook.

It will thus be seen that the device of the present invention enables the bacon to be suspended for curing and storing and that it provides a straightening rod and clamping means for holding the bacon firmly against the straightening rod or skewer to prevent curling while processing the bacon.

The chain performs the double function of preventing distortion of the slab of bacon while processing the same and affording dependent means for the attachment of a conventional hook. The chain is freely movable with the eyes of the hook and the skewer so that the full weight of the slab of bacon will operate to cause the chain to clamp the slab of bacon against the skewer. It will thus be seen that the device of the present invention enables bacon to be suspended and cured without danger of injury to the end of the slab by piercing holes therethrough and at the same time the device prevents curling of the bacon.

The labor incident to severing the strip 2 of skin from the slab of bacon is very small and this strip of skin may, of course, be removed when the bacon is sliced. Any standard means may be employed for making the cuts 3 in the narrow strip.

The bacon hanger of the present invention while designed especially for skinned slabs of bacon having the narrow strip 2 of skin at one end, may, of course, be employed for hanging unskinned slabs of bacon having the slits 3 arranged at one end of the slab in the position illustrated in Fig. 1 of the drawing.

It will also be seen that the supporting hook 9 is slidably connected with the flexible hanger member and is adapted to be readily arranged either in a central position or off center position as desired.

As shown in Fig. 3, the skewer may be inserted entirely beneath the skin.

What is claimed is:

1. A hanger for bacon comprising a skewer provided at one end with an eye and adapted to extend across a slab of bacon at the skin side thereof and engaging the skin of the bacon, said skewer having its other end projecting beyond the slab, a supporting device provided with an eye, and a flexible hanger member passing through the eye of the supporting device and extending downwardly therefrom in opposite directions to the terminal portions of the skewer to form two side portions, one of the side portions passing through the eye of the skewer and the other side portion extending beneath the adjacent end of the skewer, said flexible hanger member passing around the lean side of the slab of bacon and operating to clamp the latter against the skewer.

2. A hanger for bacon comprising a skewer adapted to extend across the skin side of a slab of bacon and engaging the skin thereof at one end of the slab, said skewer being of sufficient length to extend beyond the edges of the slab at both sides thereof, a supporting device, and a flexible hanger member slidably connected with the supporting device and adapted to extend in opposite directions therefrom to and under the terminal portions of the skewer and around the lean side of the slab of bacon for holding the same to the skewer to prevent distortion, the slidable connection between the supporting device and the flexible hanger member permitting the supporting device to be arranged either in a central or off center position.

Signed at Chicago, in the county of Cook and State of Illinois, this 28 day of September, 1931.

JOHN E. COVEY.